United States Patent [19]

Cordell, Jr.

[11] 4,060,926
[45] Dec. 6, 1977

[54] FISHING LURE WITH WEIGHTED HOOK-ATTACHING SWIVEL AND METHOD OF MAKING SAME

[76] Inventor: Carl R. Cordell, Jr., P.O. Box 2020, Hot Springs, Ark. 71901

[21] Appl. No.: 686,500

[22] Filed: May 14, 1976

[51] Int. Cl.² ............................................. A01K 85/00
[52] U.S. Cl. ................................. 43/42.44; 43/42.43
[58] Field of Search ................. 43/42.31, 42.35, 42.38, 43/42.44, 42.49, 42.53, 43.14, 42.46, 42.1, 42.21, 42.23, 42.34, 42.48, 43.1, 44.83, 42.06

[56] References Cited

U.S. PATENT DOCUMENTS

| | | | |
|---|---|---|---|
| 1,744,366 | 1/1930 | Davenport | 43/42.23 |
| 2,100,289 | 11/1937 | Khoenle | 43/42.48 |
| 2,821,045 | 1/1958 | Shabarick | 43/42.44 |
| 2,822,638 | 2/1958 | Waterfield, Jr. | 43/42.46 |
| 2,933,846 | 4/1960 | Garner | 43/42.35 |
| 3,367,057 | 2/1968 | Pond | 43/42.34 |
| 3,805,436 | 4/1974 | Davis | 43/42.35 |

Primary Examiner—Jay N. Eskovitz
Assistant Examiner—Peter K. Skiff
Attorney, Agent, or Firm—Berman, Aisenberg & Platt

[57] ABSTRACT

A hollow fishing lure body having a cavity in its lower portion defined by a spherical wall with an opening leading from the cavity to the exterior of the body. A ball-shaped weight is rollably disposed in the cavity and has embedded therein the upper portion of a swivel member, whose lower portion loosely extends through the opening and terminates below the lure body in an eye for attachment of a fish hook, capable of maximizing swiveling movements of the hook. The lure is easily and economically fabricated by forming the lure body in two complemental halves, embedding the upper portion of the swivel member in the ball weight, placing the ball in the cavity of one of the two halves of the lure body with the lower portion of the swivel member extending loosely through the opening and the eye disposed below the lure body, and cementing the two halves of the body together. Preferably, the swivel member is formed in the shape of a figure eight. Two additional cavities may be formed within the lure body at the front and rear and a pair of swivel members may be partially inserted within the added cavities prior to joinder of the body halves for attachment of leaders, lines, hooks, etc.

2 Claims, 5 Drawing Figures

U.S. Patent    Dec. 6, 1977    4,060,926
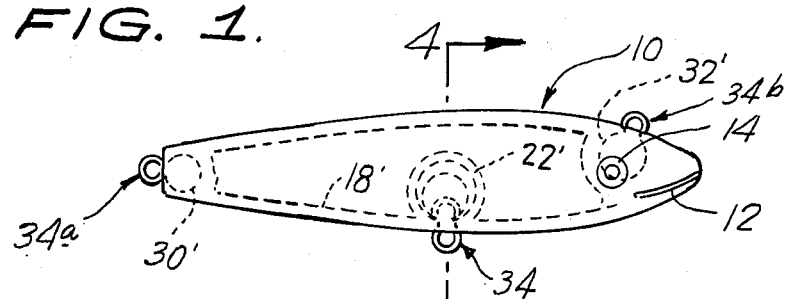
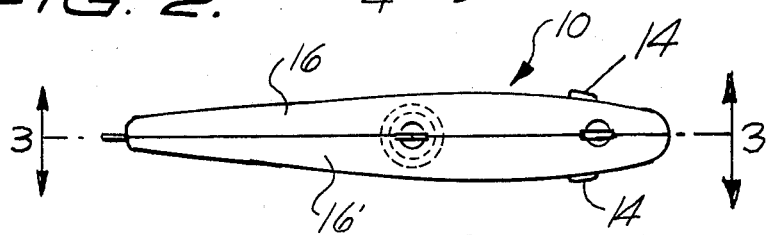
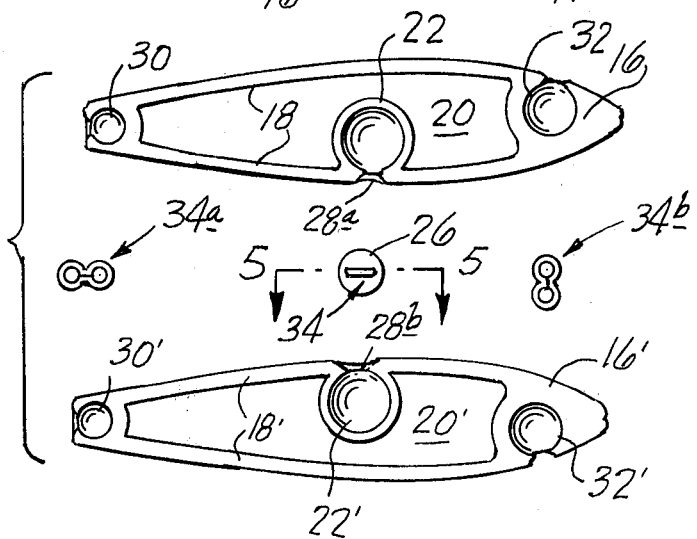
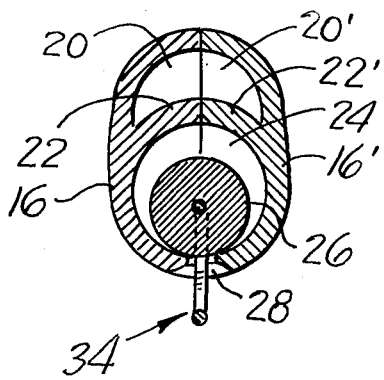
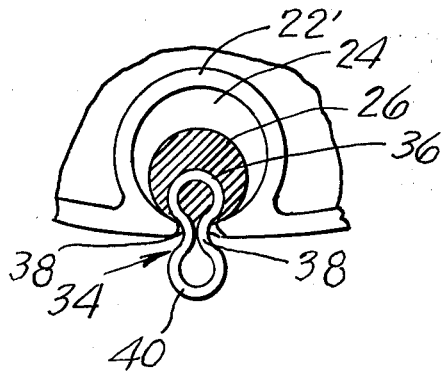

FISHING LURE WITH WEIGHTED HOOK-ATTACHING SWIVEL AND METHOD OF MAKING SAME

FIELD OF THE INVENTION

This invention relates to a fishing lure particularly adapted to catch carnivorous fish and for salt water fishing and which includes a combined weight and swivel member for attachment of a fish hook which permits free and maximum swiveling movements of the hook.

BRIEF DESCRIPTION OF THE PRIOR ART

Known lures are characterized by rather restricted swinging movements of attached hooks which often warn or impede a fish from striking the lure and hook. Conventional lures also are usually of complex structure, whose numerous parts are difficult and expensive to make and assemble.

SUMMARY OF THE INVENTION

It is a primary purpose of the present invention to overcome the above-named briefly described defects and disadvantages of conventional lures and to provide a lure which is efficient in use and effective to increase the catch of fish.

It is another important object of the invention to provide a lure having a combined weight and swivel member such as will permit greater degrees of swiveling motion to a hook attached to the eye of the swivel member.

It is still another important object of the invention to provide a lure, having the above described characteristics, which is of simplified structure having fewer parts of easily formed shapes, and which is easy and inexpensive to fabricate and assemble.

The above objects are attained by molding the lure body in two half shells to be joined along a central vertical plane so as to simulate a bait fish. Each half includes a semispherical wall with a semicircular opening leading to the bottom exterior of the body shell. To form the combined weight and swivel member, the latter is shaped as a figure eight and its upper loop is molded in a ball-shaped weight. The ball weight is then placed in the semispherical cavity of one of the shell halves with the lower portion of the swivel member loosely extending through the semicircular opening and the bottom loop disposed outside the shall half. The other shell half is then joined to the first half and cemented in place to complete the lure.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several Figures, and in which:

FIG. 1 is a side elevational view of a lure constructed in accordance with the invention;

FIG. 2 is a plan view;

FIG. 3 is an exploded view showing the two halves of the lure body separated and turned 90° away from each other to reveal their interiors;

FIG. 4 is an enlarged sectional view taken on line 4—4 of FIG. 1 and looking in the direction of the arrows; and FIG. 5 is an enlarged sectional view taken along line 5—5 of FIG. 3 and looking in the direction of the arrows.

DESCRIPTION OF THE PREFERRED EMBODIMENT

Referring now more particularly to the drawings, the improved lure is shown generally by reference numeral 10 as having the shape and appearance of a bait fish with a mouth 12 and a pair of eyes 14 in its head portion. The lure body is formed of two complemental shells 16, 16' which are mirror images of one another as best seen in FIG. 3. Each half shell is elongated and of shallow dish shape, having an elongated generally oval rim portion 18, or 18' surrounding cavities 20, 20' respectively. The half shells 16, 16' preferably are on opposite sides of a central vertical plane extending longitudinally of the lure body 10 and including line 3—3 of FIG. 2.

Within each half shell 16, 16' is formed a semispherical wall 22, or 22' opening inwardly and which, when the half shells are joined, define a spherical cavity 24 for rollably housing the ball-shaped weight 26. Cavity 24 has an opening, or passage to the bottom exterior of the lure body shown by reference numeral 28 and which is defined by the two semicircular openings 28a, 28b, (FIG. 3) in lure halves 16, 16' respectively. The walls of openings 28a, 28b are made convex to allow for more play and looseness of fit of the swivel member to be later described. A pair of smaller, mating, semispherical cavities 30, 30' are formed at the rear of the body parts 16, 16', and a similar pair of mating cavities 32, 32' are formed in the head portions of the lure body halves. The spherical cavities defined by 30, 30' and 32, 32' are provided with unnumbered openings to the exterior of the lure similar to opening 28 leading to cavity 24.

The swivel member generally indicated by numeral 34 is formed in the shape of a Figure 8 and has an upper loop portion 36, FIG. 5, integrally connected to a lower portion comprising a restricted bight 38 and a lower loop, or eye 40. The swivel member may be stamped in one piece from a corrosion resistant material such as brass or stainless steel, or may be bent from a wire of such material to facilitate attachment of the hook, a conventional resilient split ring (not shown) of the type which is split in the plane of the ring may be hung from the eye 40 and used for coupling the eye at the free end of the shank of a fish hook. When the two eyes are coupled, the hook eye is free to move virtually along the entire length of loop 40 until the hook or its shank abuts the lure body. Other types of conventional changes may obviously be used to connect the hook eye to the eye 40 with resulting freedom of oscillating relative motion, and with ease of attachment and detachment.

Similar swivel members 34a and 34b are disposed at the rear and head of the lure for attachment of a fishing line or leader at the head and a hook at the rear. In each instance, one loop of the figure eight is disposed within the cavity 30, 30' or 32, 32', and retains the swivel member connected to the lure, while the restricted bight passes loosely through the opening to the lure body exterior where the other loop is free to turn and swivel.

The ball weight 26 is preferably formed of metal, such as lead or aluminum, and is approximately one-half the diameter of cavity 24 so that it is free to roll along the cavity wall. The size and weight of the ball may be selected to provide a desired depth of sinking of the lure below the water surface. The upper portion or loop 36 of swivel member 34 is embedded by molding or otherwise in weight 26 and the restricted bight portion passes loosely through opening 28 so that the lower loop, or eye 40 is below the lure. Thus, the combined weight and swivel member 26, 34 is free to rotate 360° about its vertical axis as viewed in FIG. 5. Because of the looseness of bight 38 in opening 28, the swivel member may rock or oscillate through a solid angle of about 90° about its vertical axis. Considering that a coupled fish hook, not shown, is further free to slide along eye 40 within limits determined by the hook or its shank striking the body of the lure, the fish hook will have great freedom of swiveling and rocking movements nearly equivalent to those of a universal joint. Such freedom greatly reduces the danger of warning a fish away during his strike as he would be by a rigidly protruding hook extending away from the lure body. It also greatly lessens the danger of snagging the hook and lure in weeds or other entangling underwater obstacles.

It will be apparent that the lure of the invention, as described, is formed of very few parts of simple shape, and which may be easily and inexpensively fabricated and assembled. The preferred method of making the lure comprises the following steps:

a. the body halves 16, 16' are molded from a suitable plastic or metal material, or are stamped from a metal sheet;

b. the swivel member is bent or stamped out of a suitable wire or sheet material into its figure eight configuration and the upper loop is molded or otherwise embedded in the weight 26;

c. the ball 26 is then placed in one of the cavities 22, 22' with the bight 38 of the swivel member in opening 28a or 28b;

d. the other half 16 or 16' is mated to the first half and secured by cement along the rims 18, 18' and other abutting surfaces.

It should be clear that the above-described method of making the lure is very simple and easy to perform and, therefore, very inexpensive.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A fishing lure comprising a lure body formed of two complemental halves, each half being hollow and having a peripheral mating rim along which the halves are secured together, a cavity in the lower portion of said lure body having an opening leading to the exterior of the body, said cavity being formed by a pair of semispherical, mating walls one in each of said complemental halves and being disposed entirely within the hollow portion defined by the peripheral rim thereof, said semispherical walls of the cavity being joined together to form a spherical wall within the hollow halves to brace and strengthen the lure body and divide the same into two separate hollow chambers, and a ball-shaped weight rollably disposed in said cavity and secured to the upper portion of a swivel member whose lower portion loosely extends through said opening in the lure body and terminates below the lure body in an eye for swiveling attachment of a fish hook, said swivel member having the shape of a figure eight, the said upper portion being a loop completely embedded in said weight and being connected to said lower eye by a constricted bight portion loosely extending through the opening of the lure body.

2. The method of making a fishing lure comprising the steps of:

a. forming a lure body in two complemental, hollow halves with a spherical cavity within the lower part of the body and an opening leading to the exterior of the body, said cavity being defined by a semispherical wall formed in the hollow portion of each lure body half and adapted to mate and join to complete the spherical cavity, b. embedding the upper loop of a figure eight-shaped swivel member in a ball-shaped weight; the lower loop of the swivel member being an eye for swivel attachment of a fishing hook and being connected to the upper loop by a constricted bight, c. placing the ball weight in the cavity of one of the two halves of the lure body with the bight of the swivel member extending loosely through said opening and said lower eye disposed outside the lure body, and d. joining the two halves of the lure body and integrally securing them together.

* * * * *